United States Patent Office 3,098,382
Patented July 23, 1963

3,098,382
HYDRAULIC TEST EQUIPMENT
Jess H. Hoffman, North Hollywood, James I. Detweiler, Burbank, and Forest O. Riek, Jr., Los Angeles, Calif., assignors to Lockheed Aircraft Corporation, Burbank, Calif.
Filed Mar. 4, 1960, Ser. No. 12,743
9 Claims. (Cl. 73—168)

The present invention relates to a means for determining the characteristics of hydraulic and similar fluid systems and their components such as electro-hydraulic or mechanical-hydraulic valves. More specifically, it relates to equipment to generate interrelated electrical or mechanical functions and fluid pressure-flow functions so that the characteristics of a hydraulic system or a component thereof may be determined and controlled.

In the testing of hydraulic system components (such as electro-hydraulic or mechanical-hydraulic valves), it is necessary to provide a means for controlling and/or measuring each of three variables concerned with its function. These three variables are pressure, flow, and the controlling input to the component. The basic mathematical equation relating these three variables is shown as follows in terms of partial derivatives:

$$\frac{\alpha P}{\alpha F}\Delta F + \frac{\alpha P}{\alpha X_V}\Delta X_V = \Delta P$$

where P represents the load pressure, F the load flow and $X_V$ is the controlling input to the hydraulic component or valve that is under test. The mathematical equation is implicit, such that if any two of the variables are established or controlled as independent variables, the third variable is established or known, as a dependent variable.

The prior art has included devices to read flow of fluid through a valve for its various internal conditions (opening) at zero outlet or load pressure. The prior art has also included means to determine outlet or load pressure in the valve at various internal conditions and zero flow condition. These have involved simply the use of the valve under test as a flow control device actuating a piston calibrated for flow rate. Such devices must be made in such a manner that internal friction does not produce a substantial load pressure. In none of the prior devices are there means to determine the pressure in a hydraulic system (or a component thereof) versus the flow for its various internal conditions. In none of the prior devices has it been possible to easily simulate and determine the characteristics of the hydraulic component as experienced in its actual environment.

An important object of the present invention is to provide a novel hydraulic or similar fluid test facility capable of performing both static and dynamic measurements of any variable by itself or in combination with other variables of any fluid system or component thereof. By carefully controlling one or two of the three variables (pressure, flow and the internal characteristics of the hydraulic component), the influence on the others may be measured.

It is another important object of the present invention to provide a novel means to generate fluid flow conditions which permit a simple and accurate manner of measurement of these conditions. A piston is driven in a cylinder to produce the required pressure and flow. Fluid flow to and from the cylinder is directly proportional to the linear velocity of the displacing piston which may easily be measured. Thus, a simple means to measure flow is provided.

It is another important object of the present invention to provide a hydraulic generator capable of producing a wide range of flow and pressures. A confined volume of hydraulic fluid in a closed cylinder is forced by a piston driven at a prescribed velocity by an accurately controlled force.

It is another important object of the present invention to provide a means by which fluid flow versus pressure may be generated and measured with a high degree of accuracy. The piston is driven by accurate forces generated by an operatively connected cylinder and piston having a source of pressurized driving fluid which is accurately controlled by an input signal which is a function of the desired output pressure. The input signal to the hydraulic actuator for a piston in the generator cylinder is compared with the result through a servo feedback loop. The actuator is then automatically adjusted by this servo system to cancel any errors for increased accuracy.

It is another important object of the present invention to provide a novel means by which hydraulic pressures and flow rates may be generated by a device not affected by internal friction. Internal friction is servoed out by feeding a signal back relative to pressure of the generator piston which signal will be used to operate a valve to the actuator which will move the piston to counteract the tendencies of friction.

It is another important object of the present invention to provide feedback means to control conditions relative to the velocity and position of a generator piston.

Additional objects and advantages of the present invention will become apparent from a reading of the following specification, especially when taken in conjunction with the drawings hereto appended wherein like numerals indicate like elements.

The present invention provides means by which the three interrelated variables, pressure, flow and internal conditions of the fluid component may be measured, programmed (controlled) or servoed simultaneously or separately to perform desired tests. One or two of the variables may be programmed and the other variable measured. In certain cases, the programming of two variables results in control of the third variable. Each of the three variables may be additionally servoed in a manner which permits the other variables to follow a prescribed program functional curve.

Tests run with appropriate combinations of the three general conditions (measurement, programming or servoing) which are provided by the present invention permit a complete analysis of a hydraulic system or its components. Each of the three variables, pressure, flow and internal condition, may be programmed independently or interrelatedly in any of four ways:

a. Each may be maintained constant at zero level.
b. Each may be maintained constant at any fixed level.
c. Each may be subjected to a ramp function progressing from one level to another at a pre-established rate.
d. Each may be caused to oscillate, for example, as a sine wave.

A feedback loop is provided for each of the four ways so that each may be servoed for extremely accurate control.

Figure 1:
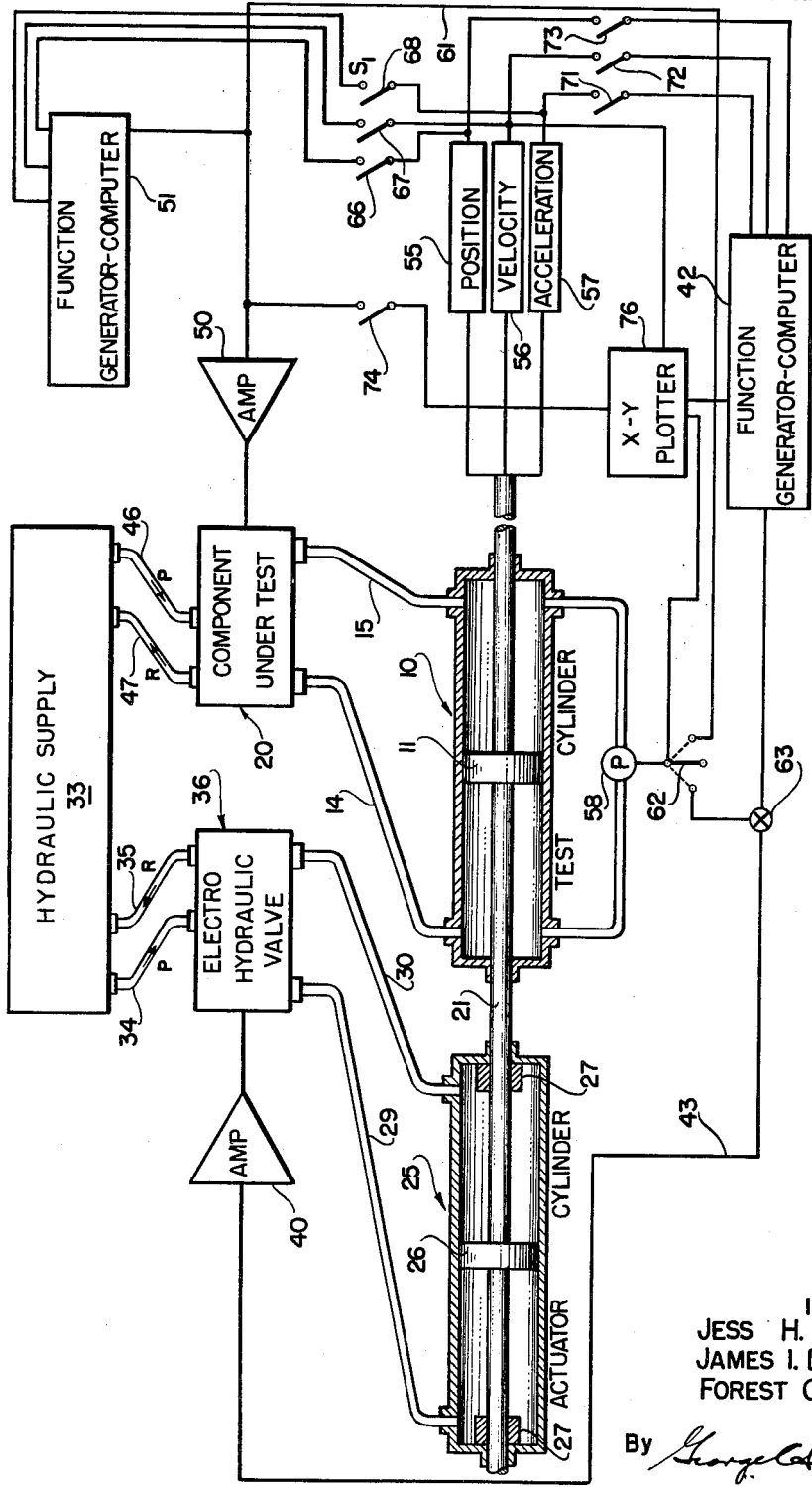
FIG. 1 is a schematic of the entire hydraulic test equipment by which the various tests as will be described herein may be performed.

FIG. 1 shows the hydraulic test equipment by which tests may be made on hydraulic systems and components such as electrically or mechanically operated valves. Included in FIG. 1 are two basic assemblies, the first of which is a means to generate fluid pressures and flows, the major member of which is a test cylinder 10. Cylinder 10 is closed at each end and has a piston 11 therein for reciprocating movement. Hydraulic fluid is confined on either side of the piston 11. Conduits 14 and 15 are connected to each end of cylinder 10 and the component 20 under test. The piston 11 is forced back and forth by means of piston rod 21. The confined fluid is forced through conduits 14 and 15 and the component 20. By forcing the piston by accurate predetermined functions of flow and pressure, the flow, pressure and internal characteristics of the component 20 can be calibrated and tested.

The other major assembly shown in FIG. 1 is a hydraulic actuator servo system for forcing the piston 11 at a predetermined velocity or variation of velocities. It includes the actuator cylinder 25 much like the test cylinder 10. Cylinder 25 has a piston 26 and conduits 29 and 30 leading to each end. The piston rod 21 is fixed to piston 26 as it is to piston 11. Thus, piston 11 and piston 26 move together as a unit. Stops 27 are provided to prevent piston 26 from closing conduits 29 and 30. Hydraulic supply 33 provides a source of fluid under pressure. Conduits 34 and 35 carry fluid to and from an electro-hydraulic valve 36 which controls the passage of pressure fluid to the actuator cylinder 25. Electro-hydraulic valve 36 governs the amount of fluid, its rate and to which end of cylinder 25 it is conducted. The electro-hydraulic valve 36 is controlled by a signal from amplifier 40 which receives its control signals from function generator 42 through line 43. Function generator 42 may be comprised of a cam driven potentiometer, one or more integrators or any other signal source which will provide the proper signal to cause the proper flow of hydraulic fluid to cylinder 25 to generate the necessary hydraulic function.

The component 20 may be a complete hydraulic system including valves, conduits or any part thereof. If the parts or components are electrically controlled a signal directly from amplifier 50 may provide the control. If mechanical, some intervening electrically powered control means must be provided so that internal conditions may be set by an electric signal. The electric signal is provided from amplifier 50 which receives its control signal from function generator 51. Function generator 51 like function generator 42 may be comprised of any means which will generate the signal to produce the required internal charactersitics of the component 20 under test. A conduit 46 is provided for fluid flow from the hydraulic supply 33 to the hydraulic component 20 under test. A return conduit 47 is provided from the component 20 to the supply 33.

Two basic servo feedback loops are provided. One loop feeds signals which are a function of the pressure and flow developed by test cylinder 10 back to function generator 42 and the other to generator 51. Position sensor 55, velocity sensor 56 and acceleration sensor 57 each sense these conditions of piston rod 21. The signals generated by each of these sensors may selectively be fed back to either function generator 51 or 42. The internal pressures of test cylinder 10 are sensed by the differential pressure sensor 58. The signal from pressure sensor 58 may be connected through switch 62 to either basic feedback loop. Switch means are provided so that selected signals for varying tests may be transmitted to function generator 42 or 51. Switch 66 provides a connection from position sensor 55 to the function generator 51. Switch 67 connects the velocity sensor 56 to the function generator 51 and switch 68 for the acceleration sensor 57 to function generator 51. Likewise, the switches 71, 72 and 73 provide a connection from sensors 55–57 to the function generator 42. Thus, feedback signals may be connected in any manner desired for various tests on hydraulic equipment.

For most tests of hydraulic systems and components, either a pressure servo loop or a velocity loop is used. The pressure servo loop is set up by connecting the switch 62 from the pressure sensor 58 to the collecting point, 63. Switches 71 to 73 would be open. A signal input from the function generator 42 then would be balanced by a signal relative to the differential in pressure between the chambers on either side of piston 11 in the test cylinder 10. This signal applied through line 43 to amplifier 40 would help govern the movement of piston 26 and thus the piston 11.

The velocity loop may be set up by closing switch 72 and opening switch 62. A signal proportional to the velocity of the piston 11 as sensed by sensor 56 is then applied to function generator 42 modifying its signal to amplifier 40 and electro-hydraulic valve 36.

Figure 2:
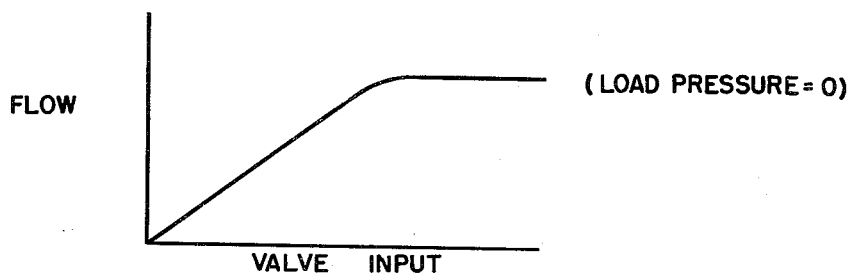
FIG. 2 is a characteristic curve of a typical fluid component for its flow at zero pressures for various internal conditions.
Figure 3:
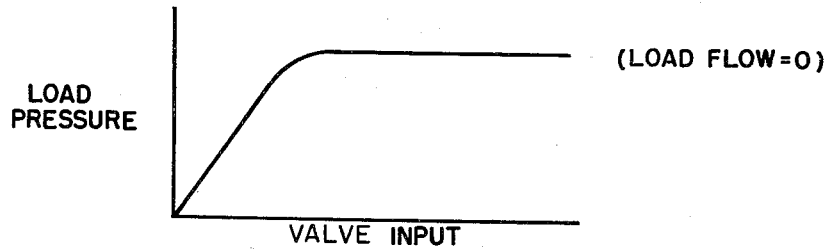
FIG. 3 is a similar characteristic curve wherein pressure is measured at zero flow for a hydraulic component at various internal conditions.
Figure 4:
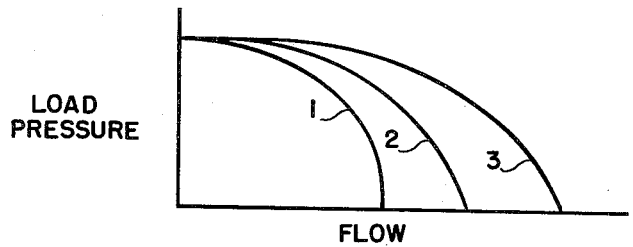
FIG. 4 is an integrated curve of pressure versus flow for various internal conditions of a hydraulic or fluid component under test.

Other servo combinations will be apparent from observation of FIG. 1. A position servo or acceleration servo around valve 36 may be effected by closing switches 71, 72 or 73. Around the component 20 under test either pressure, position, velocity or acceleration loop may be effected by closing switch 62, switch 66, switch 67 or switch 68. Any dual loop combination is also possible such as a velocity loop to valve 36 and a pressure loop to component 20. The apparatus of the present invention provides for a large variety of readings resulting in great flexibility of the equipment in test of hydraulic components. An X-Y plotter 76 is provided which will read and plot any combination of signals from the sensors and function generators. Examples of plots possible are shown in FIGS. 2, 3 and 4.

In each servo loop, several tests are possible on hydraulic equipment. For instance, with a pressure loop, flow may be plotted against zero pressure for various valve openings such as is shown in FIG. 2 or the load pressure of the hydraulic component may be plotted against its flow characteristic as shown in FIG. 4. The velocity loop will permit similar tests.

Component 20 will be treated as a valve to explain the combination shown in FIG. 1. By holding one of these variables (pressure, flow or internal condition) at a fixed level, one of the other two may be varied to determine its effect on the third. By holding pressure at zero, the valve opening may be varied and flow measured. When the variations of valve openings are plotted against flow under these conditions, a curve as shown in FIG. 2 will result. For this test, the valve 20 will be connected so that a fluid under pressure will be directed from the hydraulic supply 33 through line 46, the valve 20 and the conduit 14 to the test cylinder 10. The conduit 15 will be connected through the valve 20 so that a free return passage through conduit 47 back to hydraulic supply 33 will be made. That is, the hydraulic supply under pressure will be forced through the conduit 46, the valve 20 and the conduit 14 into the left end of cylinder 10 to force piston 11 to the right. Flow through the valve can be measured by measuring the velocity of displacement of piston 11. The signal of velocity sensor 56 can be applied to the X axis of the X-Y plotter with the signal from functional generator 51 being applied to the Y axis to strike a curve as shown in FIG. 2. It will be seen that function generator 51 will develop a signal which will take valve 20 from its closed position to full open. This signal may have any curve between the two extremes but will normally be a ramp shape. Function generator 42 will be set so that no signal is generated. In other words, zero pressure differential is maintained between the two chambers on either side of piston 11 in cylinder 10. Thus, if pressures build up in the left end of the cylinder on the left of piston 11, a signal will be transmitted to amplifier 40, causing the electro-hydraulic valve 36 to open the proper amount to bleed a pressure through conduit 29 to the left of piston 26 of actuator cylinder 25 so as to move it to the right and along with it piston 11, thereby alleviating the pressure build-up in the chamber at the left end of test cylinder 10. This movement is sensed by sensor 56 as described above.

An important advantage of the present invention is now apparent. By use of a loop system, any internal friction of the test equipment is servoed out. Assume an input signal to the valve 20 under test so as to cause increasing flow into the test cylinder 10 on the left side. It is desired that the test piston 11 will move freely without restriction to the input flow. If restriction does result from static friction, a build-up of pressure in the left end of cylinder 25 will result. With the function generator 42 set to zero input, the signal from the pressure sensor 58 will actuate the closed loop servo system shown through the electro-hydraulic valve 36 and the actuator cylinder 25 to restore the pressure at sensor 58 to zero. A smooth travel of the test piston will result. Static friction effects will be minimized by the gain of the loop. The measure of characteristics will not have to be adjusted by a figure representing friction of the test cylinder 10 to arrive at a true figure.

The flow characteristic of valve 20 may be determined using the velocity loop around the actuator cylinder 25 and a pressure loop around the valve under test. A signal which is the function of velocity is developed by generator 42 so that piston 11 is driven at a prescribed velocity. The flow output of the valve 20 under test is introduced into the left end of test cylinder 10. The differential pressure internal to the cylinder must remain at near zero level in order to maintain the correct flow. Therefore, the pressure as sensed by the pressure transducer 58 must remain constant and preferably at zero. If the valve output of the test valve 20 is not sufficient for the velocity of the test piston 11, a decrease in pressure will result. This decrease in pressure sensed by the pressure transducer 58 is amplified and applied to the function generator 51 to modify the test valve input signal. The test valve input signal is thus altered to increase the output flow. A reverse situation will occur for a build-up of pressure when the test valve is producing too much flow. Since generator 42 is developing a signal which is velocity or flow, the signal may be applied to the X axis of the X-Y plotter 76 to give a true indication of flow. A signal from function generator 51 which is a true indication of valve opening is applied to the Y axis of the X-Y plotter to result in a curve as shown in FIG. 1.

To plot or measure the pressure characteristics at zero flow for various valve opening positions (for a FIG. 3 curve) two alternatives are available. The most simple way is to lock piston 11 in place so that it cannot move. A ramp signal from function generator 51 would be applied to valve 20 and the Y axis of the X-Y plotter 76. The signal developed by pressure sensor 58 would be applied to the X axis of the plotter 76.

The position loop may be used to stop movement of piston 11, allowing pressure measurements of the valve 20 under test at zero flow. In this instance, as before, the valve is connected to the hydraulic supply 33 so that flow is from the hydraulic supply 33 through the conduit 46, the valve 20, the conduit 14, to the left end of test cylinder 10. At zero flow conditions, the piston 11 must not move. Therefore, the actuator cylinder 25 must apply sufficient pressure on the right side of piston 26 to counteract any pressure to the conduit 14 from the hydraulic pressure supply 33. The switch 73 is closed to the function generator 42 which is set at zero so that any signal developed by movement of the piston rod 21 will be applied to the amplifier 40, the electro-hydraulic valve 36 to conduct the correct amount of pressure from the pressure supply 33 through conduit 30 to the right of actuator cylinder 25 to resist the pressure in the left end of test cylinder 10.

The discussion to this point has been concerned generally with servoing of a signal controlling the variables or the setting of one of the three variables at a constant level (usually zero) and measuring the second and the third while they are permitted to follow an uncontrolled pattern. Function generators 42 and 51 may be made to generate a signal which is constant at a zero or a a fixed level (previously described), a ramp or oscillating (such as a sine wave). The signals from function generators 42 and 51 may be interrelated to or independent of each other.

For pressure-flow calibration curves as shown in FIG. 4, function generator 51 is set to generate discrete values for each curve to be plotted. Each curve is struck out at a constant valve opening. A ramp input is derived from function generator 42 and applied to amplifier 40 and valve 36. The load pressure can thus be modulated over its entire range. The pressure versus flow curves as indicated by the output of the velocity sensor 56 and the pressure sensor 58 are plotted automatically on an X-Y recorder 76 or other means desired. The measurements can be made statically for fixed points or an entire curve can be plotted for one discrete function.

Pressure-flow curves of FIG. 4 may be measured by using a command signal to electro-hydraulic valve 36 which is a function of flow rather than a standard ramp input. Thus, the signal which is a function of flow may be also applied to the Y axis of an X-Y plotter 76, alleviating the necessity for sensing velocity at sensor 56. Thus, the function generator 51 will generate a fixed signal for each run to valve 20 under test. In this instance, a position transducer 55 is used to feed back a signal to the amplifier 40 and electro-hydraulic valve 36 to regulate its velocity. The pressure transducer 58 supplies a signal which is applied to the X axis of the X-Y plotter 76 to present a curve such as is shown in FIG. 4.

It is frequently desirable to know how a component or an entire hydraulic system will react when subjected to the forces of the actual environment. These forces include the effect of springs which bias certain of the components such as valves, the viscous friction of the fluid itself and the inertia of the various masses in the system. An important feature of the present invention as shown in FIG. 1 involves its ability to simulate these actual conditions.

The function generators 42 and 51 have been described thus far as mere means to generate a function. In the instances where the conditions of an actual environment are simulated, additional computer components such as analog operational amplifiers would be added. These amplifiers can be used to adjust the gains of the simulated system as well as to simulate various other frequency dependent terms that may be in the system. In a similar manner, non-linearities in the system may also be simulated. Since the spring effect is linear, the position sensor 55 may be used to feed a signal back to either the generator computer 51 or generator computer 42 which would be set to directly simulate the springs in the actual system. Viscous friction of the fluid in the system represents a system pressure which is a function of the velocity. Therefore, the velocity sensor 56 may be used as a feedback signal to simulate velocity functions of either the generator-computer 42 or the generator-computer 51. Masses in the system create an inertia which are directly proportional to acceleration variable. Therefore, the acceleration sensor 57 may be used to feed back a signal to sum with the simulated acceleration signal of generator computer 42 or generator computer 51. The load pressure can thus be controlled as a function of any one of any combination of these variables. Thus, by closing the appropriate switches 66, 67 or 68, a loop around the component or system 20 under test will provide feedback signals so that the spring, viscous friction and acceleration variables may be simulated in that part of the system. By the same reasoning, the switches 71, 72 or 73 or all three may be closed around the valve 36 to provide feedback signals to the simulated signals for that part of the system. It will be noted that the test piston 11 area need no correspond to the actual piston area to be used in the actual system because the gain terms which equal the spring effect, the viscous friction effect and the acceleration effect of the actual system can be scaled to the level desired in the generator-computers 42 or 51.

If there are environmental variable such as temperature and external pressure which may influence the operation of the system, these may be set up by providing an environmental chamber in which the operative components of the system shown in FIG. 1 may be closed. It will be noted that, because all command functions whether simulated or actual are electrical, the hydraulic components of the system, the actuator cylinder, the test cylinder, the electro-hydraulic valve, the component under test, and even the hydraulic supply may be isolated in a sealed chamber. The electrical and electronic devices may conveniently be located on the exterior of this environmental chamber so that the tests inside may be accurately controlled. By providing the necessary temperature and pressure variations inside the environmental chamber, the test equipment may be subjected to these variables with accuracy. It can thus be seen that the present invention is well adapted to substantially all tests and influences which a hydraulic component or system may be subject to.

A universal hydraulic test bench has been disclosed which is capable of complete testing of all characteristics of a hydraulic system or of its components. The capabilities of the invention extend to accurate scheduling or programming of forces and influences to which a system is to be subjected including those of its intended environment.

Having disclosed the details of our invention, we claim the following combinations and their equivalents to which we desire the protection of a Letters Patent.

What is claimed is:

1. A method of determining the characteristics of a hydraulic component comprised of the steps of confining a volume of fluid in a closed space, forcibly changing the size of the volume, conducting the fluid from the volume through the component whose characteristics are to be determined, sensing the rate of change of the volume, sensing the internal characteristics of the component as related to the action of forces and existence of conditions internally thereof, and visually presenting the rate of volume change with relation the internal characteristics.

2. A method of determining the flow characteristics of a fluid component comprised of the steps of confining a volume of fluid in a closed space, partitioning the volume into two smaller volumes, generating a signal proportional to the range of flows over which the characteristics of the component are to be tested, forcibly changing the relative size of the two smaller volumes in relation to the signal, conducting the fluid from the decreasing of the two smaller volumes through the component, providing a source of fluid to fill the increasing of the two smaller volumes, sensing the pressure differential between the two smaller volumes and varying the relationships of the internal parts of the component to maintain a constant pressure.

3. A method of determining the flow characteristics of a fluid component comprised of the steps of confining a volume of fluid in a closed space, partitioning the volume into two smaller volumes, providing a means of fluid flow from a pressure source through said component to one of the two smaller volumes, providing a fluid communication from the other of the two smaller volumes to the source of pressure fluid, sensing the pressure differential between the two smaller volumes, changing the relative size of the two smaller volumes so as to maintain a zero pressure differential therebetween, varying the relationships of the internal parts of the component so as to permit a varying rate of flow of fluid through the component, and sensing the rate of change of the relationship between the two smaller volumes.

4. A method of determining the pressure characteristics of a fluid component over a range of changing internal characteristics for a constant flow of fluid therethrough comprised of the steps of confining a volume of fluid in a closed space, partitioning the volume into two smaller volumes, forcibly changing the relative size of the two volumes at a constant rate, conducting the fluid from the decreasing one of the two smaller volumes through the component, providing a source of fluid to fill to the increasing of the two smaller volumes, varying the relative relationships of the internal parts of the component, sensing the pressure differential between the two smaller volumes and visually presenting the varying characteristics in relation to the varying pressure between the two smaller volumes.

5. Means to test a hydraulic component comprised of a test cylinder, a first piston in the test cylinder, an actuator cylinder, a second piston in the actuator cylinder, a piston rod fixed to both pistons for unitary movement, a source of pressure fluid, conduits communicating with each end of the actuator cylinder and the source, means to control the amount and to which end of the actuator cylinder the pressure fluid will flow, means to return fluid from the other end of the actuator cylinder to the source, conduits communicating with each end of the test cylinder and the component under test, conduits communicating with the source of pressure fluid in the component and means to control the relationships of the internal parts of the component.

6. Means to test a hydraulic component comprised of a test cylinder, a piston in the test cylinder for reciprocating movement, a source of pressure fluid, means to conduct fluid from the source to the component under test, means to conduct fluid from the component to the test cylinder, means to conduct fluid from the test cylinder to the component under test, means to conduct fluid from the component to the source, means to force the piston longitudinally in the test cylinder, means to measure the movement of the piston, means to measure the position of the piston means to control the relationships of the internal parts of the component and means to measure the relationships of the internal parts of the component.

7. Means to test a hydraulic component comprised of means to confine a volume of fluid, means to partition the volume of fluid, a source of pressure fluid, means to conduct fluid from the source to the component, means to conduct fluid from the component to means to confine a volume of fluid, means to conduct fluid from the means to confine a volume of fluid to the component, means to conduct fluid from the component to the source, first signal responsive means to move the means to partition so as to drive fluid from the space on one side thereof, means to generate a first signal of desired characteristics, means to apply the first signal to the first signal responsive means, means to measure the movement of the partition, means to measure the position of the partition means, second signal responsive means to control the relationships of the internal parts of the component, means to generate a second signal of desired characteristics, means to apply the second signal to the second signal responsive means and means to measure the relationships of the internal parts of the component.

8. Means to test a hydraulic component comprised of means to confine a volume of fluid, means to partition the volume of fluid, a source of pressure fluid, means to conduct fluid from the source of the component under test, means to conduct fluid from the component to the means to confine a volume of fluid, means to conduct fluid from the means to confine a volume of fluid to a component under test, means to conduct fluid from the component to the source, means to move the means to partition so as to drive fluid from the space on one side thereof, means to measure the movement of the means to partition, means to measure the position of the means to partition, means to control the relationships of the internal parts of the component and means to measure the relationships of the internal parts of the component.

9. Means to test a hydraulic component comprised of means to confine a volume of fluid, means to partition the volume of fluid, a source of pressure fluid, means to conduct fluid from the source to the component under test, means to conduct fluid from the component to the means to confine a volume of fluid, means to conduct fluid from the means to confine a volume of fluid to the component under test, means to conduct fluid from the component to the source, first signal responsive means to move the partition so as to drive fluid from the space on one side thereof to said means to conduct fluid to the component, means to generate a varying first signal, means to apply the first signal to the first signal responsive means, second signal responsive means to control the internal opening size and shape of the component under test, means to generate a varying second signal, means to apply the second signal to the second signal responsive means, means responsive to differences in pressure on either side of the means to partition to generate a third signal, means responsive to the position of the means to partition to generate a fourth signal, means responsive to the velocity of the means to partition to generate a fifth signal, means responsive to the acceleration of the means to partition to generate a sixth signal, means to sum the third signal with the first signal, means to sum the third signal with the second signal, means to sum the fourth signal with the first signal, means to sum the fourth signal with the second signal, means to sum the fifth signal with the first signal, means to sum the fifth signal with the second signal, means to sum the sixth signal with the first signal, means to sum the sixth signal with the means to sum the second signal and means to measure the relative relationships of the internal parts of the component under test.

References Cited in the file of this patent

UNITED STATES PATENTS

| | | |
|---|---|---|
| 2,459,535 | Kopischiansky | Jan. 18, 1949 |
| 2,934,938 | Rhoades | May 3, 1960 |
| 2,969,773 | Henry | Jan. 31, 1961 |
| 3,009,447 | Lloyd | Nov. 21, 1961 |